April 15, 1952     L. E. BLUE     2,593,094
HEATING AND VENTILATING SYSTEM
Filed May 3, 1945     3 Sheets-Sheet 2
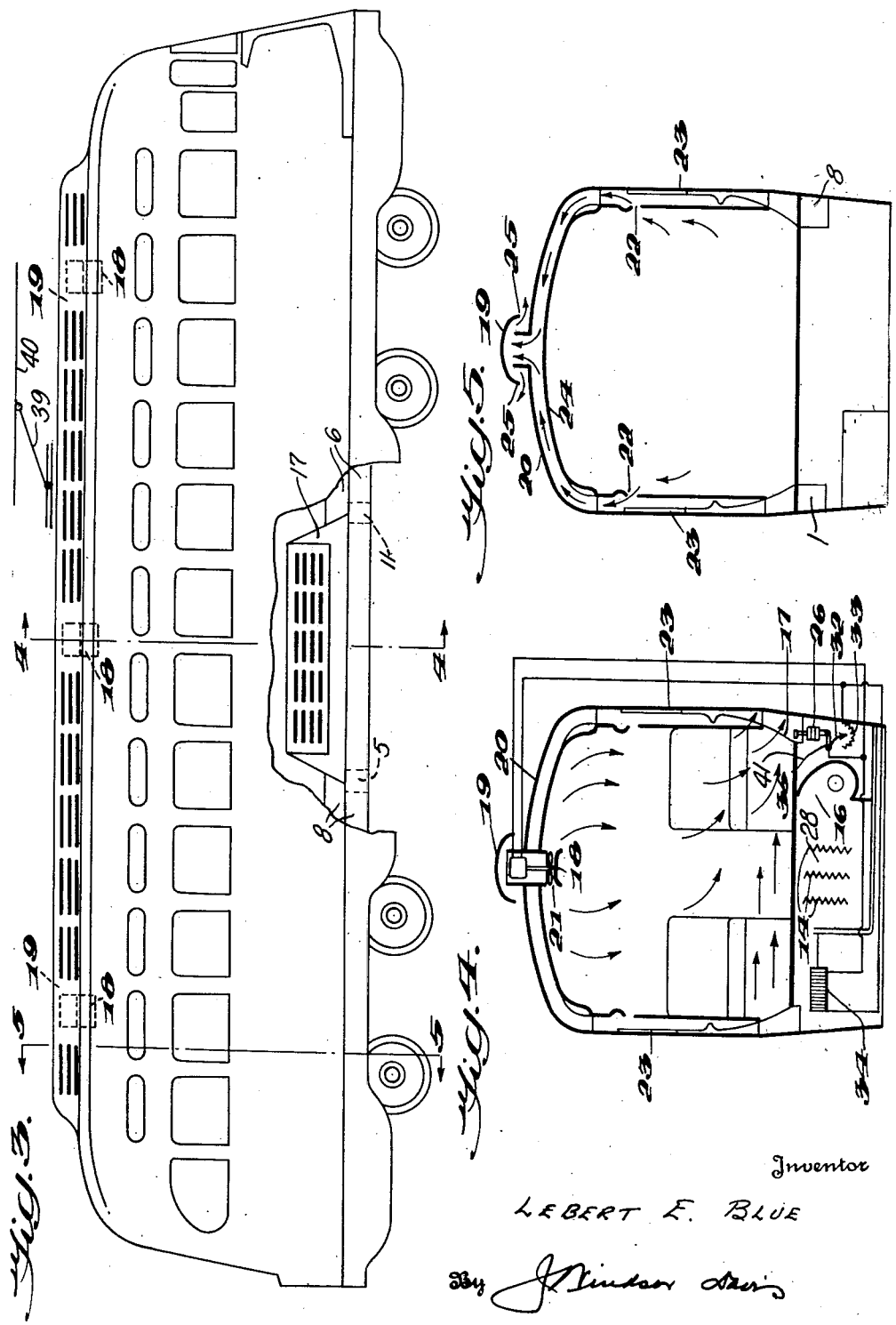
Inventor
LEBERT E. BLUE
By J. Windsor Davis
Attorney

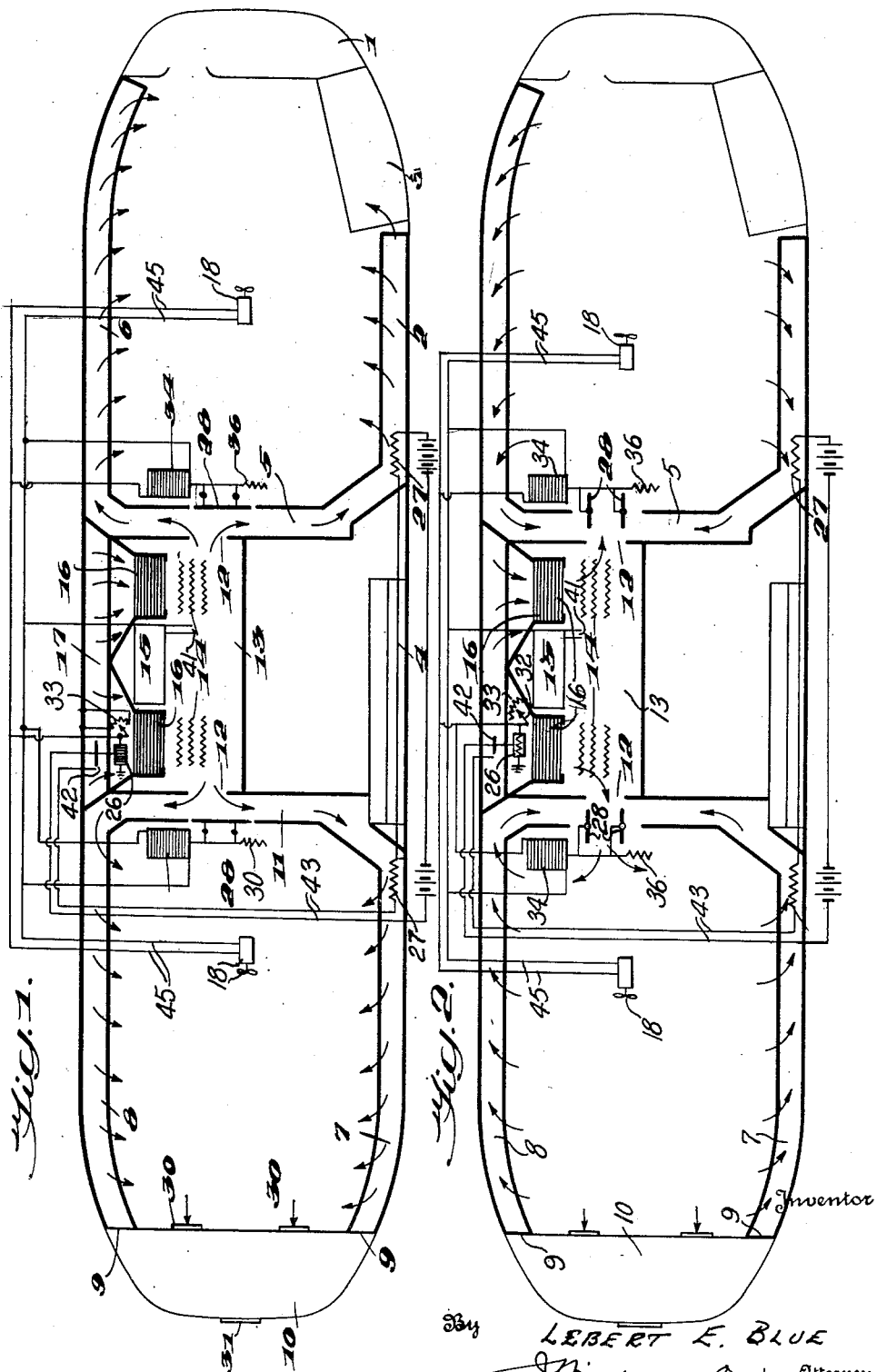

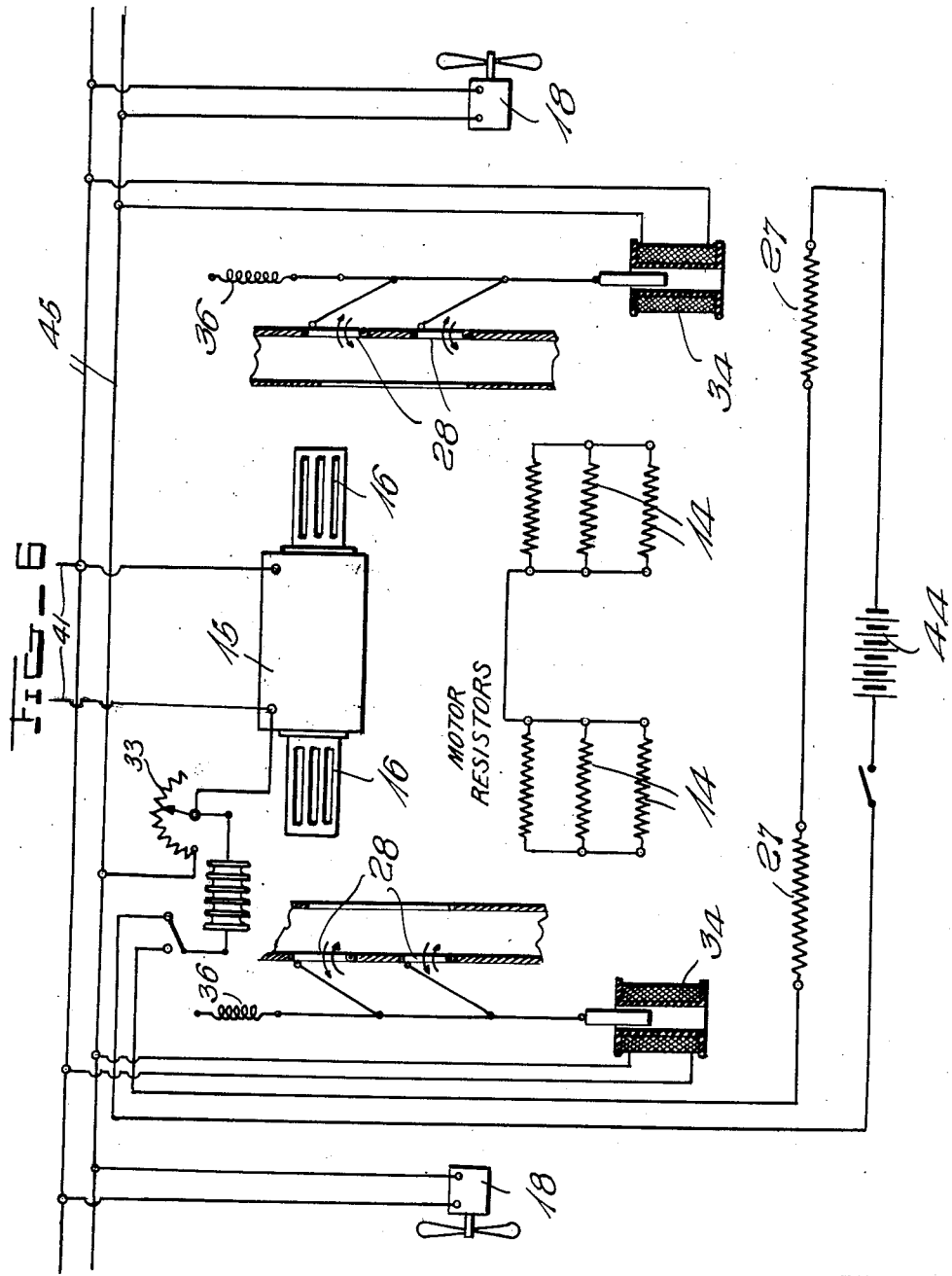

Patented Apr. 15, 1952

2,593,094

UNITED STATES PATENT OFFICE 2,593,094

HEATING AND VENTILATING SYSTEM

Lebert E. Blue, New York, N. Y., assignor to Transit Research Corporation, New York, N. Y., a corporation of New York Application May 3, 1945, Serial No. 591,817

6 Claims. (Cl. 98—10)

This invention relates to heating and ventilating systems for public vehicles such as street car bodies and has for its object to provide a system which will provide passenger comfort during very hot weather by the process of evaporative cooling by fresh air, which will provide for passenger comfort during very cold weather by the process of recirculating a substantial portion of the air within the car body over resistance heaters, and which will provide passenger comfort for intermediate weather conditions by a combination of these two processes under an automatic control.

Another object is to provide for substantially uniform air turbulence without objectionable draft within the car body by the manner of introducing air above the heads of the passengers, air being vented from the body through the roof, through the doors and from the region of the floor.

Another object is to provide a ventilating system which will function best when the windows are sealed against opening or other loss of air therepast. The advantages of fixed windows with this system are: a saving in car body cost by elimination of sash raising mechanism, extra cost of movable sash and window guards, a reduction of accident hazard and improved facility for car washing. Another advantage is that it permits the car interior to be under sufficient positive pressure to assist in excluding dirt and dust during very hot weather.

A further object is to provide a series of intake ventilators with fans or blowers associated therewith in order to force air into the car body together with outlet means located in the car body roof, return air to the outlet means passing continuously between a headlining and the roof during hot weather. It has been found that moving air through the space between the headliner and the roof is the most effective insulation for keeping the ceiling cool when outside temperatures are high and when the sun is shining on the roof.

Another object is to provide thermostatic control means for regulating the amount of air delivered by the roof blowers by regulating the speed of the blowers.

Another object is to provide ducts for receiving the air from the resistor compartment together with thermostatically controlled means for directing all or a portion or none of this heated air to the interior of the car body, that portion not directed into the car body being vented beneath the floor of the car. A substantially uniform volume of air thus flows over the resistors but the body receives only that portion called for by the control device.

Another object is to provide means for reversing the flow of air through the main ducts in non-heating periods in order to prevent heating of the cross ducts and other metal parts adjacent the resistor compartment.

It is conventional construction to provide a battery compartment at the rear of the car body. A further object of this invention is to provide a car body ventilation system in which the body interior is maintained under positive pressure and having vents which outlet into the battery compartment thus maintaining a flow of air therethrough.

Other objects and advantages will become hereinafter more fully apparent as reference is had to the accompanying drawings in which my invention is illustrated and in which Figure 1 is a schematic view of my improved heating and ventilating system substantially at the floor level of the vehicle body, showing air being circulated into the body, Figure 2 is a view similar to Figure 1 with the flow of air reversed, Figure 3 is a side elevation of the vehicle showing the roof inlets and vents and the side louvers, Figure 4 is a vertical section taken along the line 4—4 of Figure 3, and Figure 5 is a vertical section taken along the line 5—5 of Figure 3.

Figure 6 shows the complete wiring diagram of the various circuits.

The car body 1 has air ducts 2, extending longitudinally from the front steps 3 to the region of the center steps 4 and opening into a cross duct 5. The duct 5 is open into a second longitudinal duct 6 along the opposite side of the body 1 which terminates toward the front end of the body.

Longitudinal ducts 7 and 8 are similarly found along opposite sides of the rear of the body 1, both terminating at 9 short of the battery compartment 10, and both opening into a cross-duct 11.

The ducts 2, 6, 7 and 8 may be body side girders or merely air ducts. In either case they have a multiplicity of outlets along the length thereof and immediately above the floor of the body 1. It is contemplated that the body 1 will have the usual seats for passengers and that an outlet will be provided beneath each seat.

The ducts 5 and 11 may be body cross sills which support the floor of the body. Each of these ducts has an inlet 12 opening into the equipment compartment 13 which houses certain controller equipment including the main resistors 14 of the motors (not shown) which propel the vehicle, and a motor 15 having blowers 16 rotated thereby. The main motors are supplied with current by means of a trolley 39 in operative contact with a main power line 40. The motor 15 is connected to that source of power by the lines 41. The blowers 16 induce a flow of air through a screen or plate 17 having a plurality of louvers therein and propel the air over and against the resistors 14, the air then being forced through the openings 12 and, according to the arrangement of Figure 1, into the ducts 5 and 11 where it divides and flows into the ducts 2, 6, 7 and 8.

The supply of air to the louver plate 17 is best shown in Figure 4 in which it is seen that a fan or blower 18 is located in a monitor 19 in the roof 20 of the vehicle body. There are, preferably, several of these blowers 18, three being indicated in Figure 3, at spaced intervals. Each of these blowers has diffuser devices 21 which are so designed as to provide uniform turbulence throughout the car without objectionable draft, insofar as possible. The exact design of these diffuser devices forms no part of my invention. These fans 18 draw air from the vicinity of the roof of the car, where the cleanest air is available, and direct it into the car body as indicated by the arrows in Figure 4.

In addition to the flow of air through the louver plate 17, it is seen in Figure 5 that air is also vented from the body through openings 22 immediately above the windows 23 where it rises between the walls of the body and flows between the roof and ceiling or headliner 24, then outwardly through openings 25 in the monitor 19. This flow under the roof is very effective in very hot weather to reduce the temperature within the body. The operation is as follows: suppose first that the weather is quite cold and that maximum heating is desired. The blowers 16 draw air from the interior of the body, force it over the resistors 14 and thence outwardly through the ducts 5 and 11 where it is divided and directed through the ducts 2, 6, 7 and 8. A thermostat 26, located in the stream of air passing through the louver plate 17, has three functions to perform: first, it controls the "on" and "off" position of auxiliary heaters 27 located near the entrance of the ducts 2 and 7 by opening and closing the switch 42 in the lines 43 which connect the heaters to the batteries 44. Thus, when the temperature in the car body drops below a predetermined point these heaters are turned on: second, it controls the speed of the blowers 18, causing these blowers to stop completely or to operate at very slow speed during very cold weather when a minimum of fresh, cold air is to be introduced into the body, and causing the motors to increase their speed gradually, or in progressive stages, with increasing temperatures within the body. The thermostat 26 may be a bellows which expands under increasing temperatures and actuates a bellcrank 35, one end of which is a variable resistor hand 32 associated with a resistance 33. One end of the resistance 33 and the pivotal end of the hand 32 is in circuit with the motors of the fans 18. Decrease of current causes the motor to operate at minimum or zero speed: and third, the thermostat 26 controls the opening and closing of the dampers 28 in the ducts 5 and 11 which are open to the ducts 2, 6, 7 and 8. A motor 34 in circuit with a rheostat, here illustrated for simplicity as being the rheostat 32, 33, controlled by thermostat 26 closes the damper 28 when air is directed through the ducts 5 and 11. Decrease of current flow causes the damper to close under action of a spring 36. During cold weather conditions, the thermostatic control 26 thus causes energization of the heaters 27, reduces the speed of the fans 18, and rotates the dampers 28 to the closed position indicated in Figure 1. The air drawn through the louver plate 17 is thus largely recirculated air with some fresh air introduced by the fans 18. Venting of a portion of the air always takes place through the openings 22, 25 and, of course, there is always some loss of heated air when the car body doors are opened for passengers. It will also be noted that rear louvers 30 are always open to the battery compartment 10 so that this compartment is ventilated and fumes therefrom are prevented from entering the passenger compartment. Outlets 31 from this compartment are, of course, provided.

Under hot weather conditions, the operation of the system is as follows: The control 26 will cause de-energization of the auxiliary heaters 27 except during very cold weather and hence will maintain them de-energized during very hot weather. The control will open the dampers 28 so that air forced over the resistors 14 will be dumped beneath the floor of the car body. The blowers 16 will then draw air from the interior of the body through the louver plate 17. Thus no heated air is returned to the interior of the body but air is constantly being withdrawn from the lower part of the body. The control 26 causes the fans 18 to deliver their maximum volume of air into the body and, under these conditions, greatest effect is had when the volume is sufficiently great to cause a flow, also, out the vents 22 and 25 to cool the roof 20.

There will be a reverse flow through the ducts 2, 6, 7 and 8 since the flow through the openings 12 and past the dampers 28, Fig. 2, will induce some suction in these ducts. Also when the blowers 18 are delivering their maximum volume the interior of the body will be at a pressure slightly above atmospheric and will cause the reverse flow in the longitudinal ducts.

During temperature conditions between "very hot" and "very cold" the controller 26 will move the variable resistor arm 32 to some intermediate position on the resistance 33 and the fans 18 will be rotated at some intermediate speed between high and zero. As the temperature within the car body rises the fans 18 will increase in speed until a predetermined temperature is reached at which the dampers 28 will be opened by the solenoids 34. After the fans start and before the dampers 28 are open a portion of the air will be recirculated and the remainder will be fresh air, the proportion depending upon the position of the controllers 26. After the dampers 28 open the fans 18 can further increase in speed with increasing temperature.

Various modifications may be made without departing from the spirit of my invention and I desire to be extended protection as defined by the appended claims.

What I claim is:

1. A heating and ventilating system for a vehicle body comprising air ducts having a multiplicity of outlets near the floor thereof, a blower and resistors located beneath said floor, an inlet for said blower opening to the interior of said body near said floor through which said blower receives its total air supply, ducts leading from said resistors to the first named ducts, dampers located in the second named ducts operative to outlet any portion of the air from said resistors to the atmosphere beneath said body while directing the remainder thereof to said first ducts, further outlets located in the roof of said body, blower means introducing fresh air through said roof, and thermostatic means located in the air stream directly feeding the first named blower controlling both the volume of air delivered through said roof and the position of said dampers, said thermostatic means causing increasing opening of said dampers while increasing the volume of air delivered through said roof and causing a decreasing volume of air through said roof with closing of said dampers.

2. A heating and ventilating system for a vehicle body having doors and windows comprising air ducts having a multiplicity of outlets near the floor thereof, a blower and resistors located in a compartment beneath said floor, duct means connecting the compartment in which said resistors are located to said air ducts, an inlet for said blower opening to the interior of said body through which said blower receives its total air supply, dampers located in the walls of said duct means operative to dump the air from said resistors outwardly of said body or to direct any portion thereof to said air ducts, roof blowers for forcing fresh air from above the roof of said body into the interior thereof, thermostatic means located in the inlet to said blower controlling the position of said dampers and active to vary the speed of said roof blowers whereby to vary the volume of air delivered thereby, a ceiling for said body in spaced relation with said roof, and air ducts always open to the interior of said body immediately above said windows opening into the space between said roof and said ceiling, said space having outlets to the atmosphere above said roof, said roof blowers having capacity to establish and to maintain a positive pressure above atmospheric in said body when said dampers are fully open when the windows and doors of the body are closed.

3. A heating and ventilating system for a vehicle body having doors and windows comprising air ducts having a multiplicity of outlets near the floor thereof, a blower and resistors located in a compartment beneath said floor, duct means connecting the compartment in which said resistors are located to said air ducts, an inlet for said blower opening to the interior of said body through which said blower receives its total air supply, said blower delivering all air entering said inlet to said resistors, dampers located in the walls of said duct means operative to dump the air from said resistors outwardly of said body or to direct any portion thereof to said air ducts, roof blowers for forcing fresh air from above the roof of said body into the interior thereof, means for varying the speed of said roof blowers whereby to vary the volume of air delivered thereby, a ceiling for said body in spaced relation with said roof, and air ducts always open to the interior of said body immediately above said windows opening into the space between said roof and said ceiling, said space having outlets to the atmosphere above said roof, and thermostatic control means located within said body and automatically operative to increase the speed of said roof blowers with increasing opening of said dampers, said roof blowers when at maximum speed having capacity to maintain a positive pressure above atmospheric in said body when said dampers are fully open provided said doors and windows are closed.

4. In a heating and ventilating system for a vehicle, means withdrawing air from the body of the vehicle near the floor thereof, means heating the air after its withdrawal from said body, regulatable means including a damper and thermostatic means controlling the position of said damper governing the return of all or any part or none of said air into said body, pressure means delivering air through the roof of said body directly into said body, said thermostatic control means being also connected to said pressure means and operative to increase the delivery of air by said pressure means with decreasing return of air by said regulatable means.

5. In a heating system, the combination comprising a pair of ducts to conduct air to and from a space to be heated, a duct connected between said pair of ducts having a pair of diametrically aligned openings intermediate the ends thereof, one of said openings being smaller than the other, the larger opening communicating with the atmosphere, a source of hot air including a housing connected to the smaller opening of said last duct, a pair of doors, means for movably supporting said doors, said doors in one position closing said larger opening whereby heated air from said housing flows to said pair of ducts, and said doors in another position leaving said larger opening unobstructed to produce a Venturi-like action by which heated air is discharged to atmosphere from said housing causing air to be drawn from the space to be heated through said pair of ducts and also discharged to atmosphere through said larger opening.

6. In a heating system, the combination comprising a pair of ducts to conduct air to and from a space to be heated, a duct connected between said pair of ducts having a pair of diametrically aligned openings intermediate the ends thereof, one of said openings being smaller than the other, the larger opening communicating with the atmosphere, a source of hot air including a housing connected to the smaller opening of said last duct, a pair of doors, means adjacent said larger opening for movably supporting said doors, said doors in one position closing said larger opening whereby heated air from said housing flows to said pair of ducts, and said doors in another position leaving said larger opening unobstructed to produce a Venturi-like action by which heated air is discharged to atmosphere from said housing causing air to be drawn from the space to be heated through said pair of ducts and also discharged to atmosphere through said larger openings.

LEBERT E. BLUE.

REFERENCES CITED

The following references are of record in the file of this patent:

UNITED STATES PATENTS

| Number | Name | Date |
|---|---|---|
| 1,024,438 | Cooke | Apr. 23, 1912 |
| 1,615,164 | Brown | Jan. 18, 1927 |
| 2,053,606 | Flammang | Sept. 8, 1936 |
| 2,058,252 | Parsons | Oct. 20, 1936 |
| 2,115,472 | Sargent | Apr. 26, 1938 |
| 2,130,131 | Hirshfeld | Sept. 13, 1938 |
| 2,178,644 | Piron | Nov. 7, 1939 |
| 2,197,740 | Bergstrom | Apr. 16, 1940 |
| 2,275,120 | Williams | Mar. 3, 1942 |
| 2,294,363 | Brockway | Sept. 1, 1942 |
| 2,351,096 | Blue | June 13, 1944 |

FOREIGN PATENTS

| Number | Country | Date |
|---|---|---|
| 843,059 | France | Mar. 20, 1939 |